US006459025B1

(12) United States Patent
D'Addario

(10) Patent No.: US 6,459,025 B1
(45) Date of Patent: Oct. 1, 2002

(54) CAPO

(75) Inventor: James D'Addario, Old Westbury, NY (US)

(73) Assignee: J. D'Addario & Co., Inc., Farmingdale, NY (US)

(*) Notice: Subject to any disclaimer, the term of this patent is extended or adjusted under 35 U.S.C. 154(b) by 0 days.

(21) Appl. No.: 09/848,872

(22) Filed: May 4, 2001

(51) Int. Cl.[7] ................................................ G01D 3/00
(52) U.S. Cl. ........................................................ 84/318
(58) Field of Search ........................................... 84/318

(56) References Cited

U.S. PATENT DOCUMENTS

| | | | | | |
|---|---|---|---|---|---|
| 4,270,432 A | * | 6/1981 | Wilkerson | .................. | 84/318 |
| 4,304,165 A | | 12/1981 | Gould | .................. | 84/318 |
| 4,324,165 A | * | 4/1982 | Wilkerson | .................. | 84/318 |
| 5,117,723 A | * | 6/1992 | Veenschoten | .................. | 84/318 |
| 5,492,045 A | | 2/1996 | Roblee | .................. | 84/318 |
| D372,259 S | | 7/1996 | Kyser | .................. | D17/21 |
| D378,825 S | | 4/1997 | Dunlop | .................. | D17/20 |
| 5,623,110 A | | 4/1997 | Hoglund et al. | .................. | 84/318 |
| 5,792,969 A | | 8/1998 | Shubb et al. | .................. | 84/318 |
| 5,859,378 A | | 1/1999 | Freeland et al. | .................. | 84/454 |
| 6,005,174 A | | 12/1999 | Regen | .................. | 84/318 |
| 6,008,441 A | | 12/1999 | Steinberger | .................. | 84/318 |
| 6,013,868 A | | 1/2000 | Sims et al. | .................. | 84/318 |
| 6,096,954 A | | 8/2000 | Hatfield | .................. | 84/329 |
| 6,107,554 A | | 8/2000 | Riddle | .................. | 84/300 |

* cited by examiner

*Primary Examiner*—Shih-yung Hsieh
(74) *Attorney, Agent, or Firm*—Gerald T. Bodner

(57) ABSTRACT

A capo for use with a stringed, musical instrument includes an L-shaped housing having a fixed arm, a swing arm pivotably mounted to the housing and being spaced apart from the fixed arm, a ratchet and pinion gear assembly and a pawl assembly. The swing arm is moveable relative to the fixed arm to change the spacing between the arms. The ratchet and pinion gear assembly includes a pinion gear and a ratchet wheel co-axially mounted together on and rotatable with respect to the housing. The swing arm includes a toothed end portion which is engaged by the pinion gear. The pawl assembly includes a pawl pivotably mounted on the housing and a spring engaging the pawl and biasing it such that it contacts the ratchet wheel unless disengaged by the user. The pawl prevents rotation of the ratchet wheel and the pinion gear in at least one direction when it engages the ratchet wheel.

15 Claims, 7 Drawing Sheets

CAPO

BACKGROUND OF THE INVENTION

1. Field of the Invention

The present invention generally relates to capos for stringed, musical instruments.

2. Description of the Prior Art

A capo is a device used by players of stringed, musical instruments. It is comparable to a clamp which may be mounted around the neck of the instrument at any desired position and which presses the strings onto the fingerboard for the purpose of enabling the player to play in a variety of keys while employing the same fingering. The device had previously been referred to as a "capodastro", and sometimes a "capotasto", but now is commonly referred to by just the term "capo".

Over the last two centuries, capos have been designed in hundreds of different ornamental and structural ways, and there are more than one hundred thirty (130) capo patents. A detailed history of the evolution of the capo, with photographs of the various designs, may be viewed at the Sterner Capo Museum website, at http://w 1.865.telia.com/~u86505074/capomuseum/.

One of simplest and most commonly used capos is referred to as the "Russell capo", named after its inventor, William H. Russell. The Russell capo has an elastic webbing with three or four grommeted holes, and a steel pin with a rubber covering. The player would need two hands to stretch the capo over the neck of the instrument and insert an end of the steel pin into one of the grommeted holes.

In 1965, James Dunlop developed an ingenious variation of the Russell-type capo. The Dunlop "toggle capo" includes a nylon or polypropylene webbing attached at one end to a moveable lever, and a molded body having a series of open notches. The molded body is placed against the strings of the musical instrument, and the lever is received in a selected notch to provide the desired tension to the webbing. The lever is then locked in place. The Dunlop toggle capo still requires two hands for attachment to the musical instrument.

Another capo design is disclosed in U.S. Pat. No. 5,792,969 to Richard Shubb and David Coontz. This capo has a frame with a top arm to contact the strings and a side arm with a jaw member and a lever member both pivotably attached to the side arm. A thumb screw is used to adjust the capo to the proper tension and for fastening it to the neck of the instrument. Again, the Shubb and Coontz capo requires the player to use two hands for proper placement and adjustment.

Other capo designs were made of metal or plastic and had varying features. There are several on the market today with a heavy spring loaded structure that allows the player to install and remove them with one hand. Although convenient to operate, they have several drawbacks. They are physically quite large and obtrusive looking in use on the instruments. They are also uncomfortable to carry around in a pant pocket. An example of a spring loaded capo is disclosed in U.S. Pat. No. Des. 372,259 to H. Milton Kyser. A less ornamental spring "trigger" capo is disclosed in U.S. Pat. No. Des. 378,825 to James A. Dunlop.

One of the major drawbacks of the Kyser capo and Dunlop trigger capo relates to their heavy and non-adjustable spring pressure. In certain capo models, and in certain positions on the musical instrument, the spring pressure will be too great and will depress the strings with more force than is necessary to hold them against the fret without buzzing. This excessive force may change the tuning of the strings, requiring the player to retune as he or she moves the capo to different positions or removes the capo from the musical instrument.

As is evident from the description of the conventional capos, each exhibits at least one disadvantage due to its mechanical structure: it may be large and cumbersome; it may require two hands to attach or reposition on the instrument neck; or it may not provide the proper tension to the strings.

Another drawback of some existing capos relates to its placement on the musical instrument. The profile of a guitar neck, for example, varies with each guitar and may be oddly shaped in cross-section. The neck is tapered and much thinner at the first fret and thicker as you go up the fingerboard toward the guitar body. The capo should be designed to function on a variety of guitars.

Most of the capos mentioned above contact the underside of the neck of the instrument at only one point, usually at its center. With respect to a guitar, for example, the force required to hold all six strings down is applied at this one point. The larger diameter strings need more force than the smaller diameter strings. In almost all cases, with existing capos, it is difficult to properly apply a tension sufficient enough to hold the large diameter strings down without pulling the other strings out of tune.

OBJECTS AND SUMMARY OF THE INVENTION

It is an object of the present invention to provide an improved capo for a stringed, musical instrument which may be easily attached to and adjusted on the musical instrument by the player using one hand.

It is another object of the present invention to provide a capo for a stringed, musical instrument which is relatively small and lightweight, and may be easily carried in the player's pocket.

It is yet another object of the present invention to provide a capo for a stringed, musical instrument which can apply in fine gradations the proper tension to the strings of the instrument.

It is a further object of the present invention to provide a capo for a stringed, musical instrument which self-adjusts to the shape of the instrument neck wherever it is placed on the neck to provide the proper tension to the strings.

It is still a further object of the present invention to provide a capo for a stringed, musical instrument which is adapted for use on a variety of instruments having necks of different diameters.

It is still another object of the present invention to provide a capo for a stringed, musical instrument which overcomes the inherent disadvantages of conventional capos.

A capo, formed in accordance with one aspect of the present invention, which incorporates some preferred features, includes a fixed arm and a swing arm moveable relative to the fixed arm. The fixed arm and the swing arm are spaced apart from each other to define therebetween an opening for receiving the neck of the stringed, musical instrument. The swing arm has a free end portion and a toothed end portion opposite the free end portion.

The capo further includes a gear assembly having at least one gear rotatably secured to the fixed arm. The gear engages the toothed end portion of the swing arm. When the user of the capo squeezes the two arms together about the neck of the instrument, the swing arm will move relative to the fixed arm, causing the gear to rotate.

The capo further includes a pawl which is pivotably secured to the fixed arm. The pawl engages the gear assembly and prevents the gear from rotating in at least one direction until the pawl is purposely released from engagement by the player.

Using only one hand, the player places the capo onto the neck of the instrument, with the neck between the two arms, and squeezes the arms together. The swing arm engages the back of the neck while the fixed arm applies pressure to the strings and forces the strings against the fingerboard. By squeezing the arms together, the player causes the swing arm to pivot towards the fixed arm, causing the gear to rotate. The pawl preferably allows the gear to rotate in one direction, to tighten the capo on the instrument neck, but not in the other direction which would loosen the capo. To remove the capo, or to reposition it on the instrument neck, the player disengages the pawl from the gear assembly, which allows the arms of the capo to open.

In order to apply a precise tension to the strings, the capo preferably has a gear assembly comprising a pinion gear and ratchet wheel co-axially mounted together and rotatably secured to the fixed arm. The ratchet wheel engages the pawl. The pinion gear has fewer teeth than the ratchet wheel, and engages the toothed end portion of the swing arm.

The toothed end portion of the swing arm is preferably formed as a gear segment whose teeth intermesh with like teeth of the pinion gear. The ratio of the radius of the toothed end portion of the swing arm to the radius of the pinion gear is preferably between about 2:1 and about 5:1 to provide greater rotation of the pinion gear with correspondingly less rotational movement of the toothed end portion about the pivot point of the swing arm. The gearing, along with the greater number of teeth on the ratchet wheel, provides a very fine resolution in adjustable tension that may be applied by the capo to the strings.

Also, in a preferred embodiment, the swing arm includes a concave swivel shoe mounted on its free end portion. The swivel shoe includes two spaced apart bottom pads which engage the back of the instrument neck in two places. The swivel shoe is mounted on a pivot pin or bushing on the swing arm which is received by an elongated opening formed in the shoe. This allows the swivel shoe to pivot and move longitudinally with respect to the swing arm so that, when the player clamps the capo on the instrument neck, it self-adjusts to whatever shape the neck has and thus applies the proper tension to the strings.

These and other objects, features and advantages of this invention will become apparent from the following detailed description of illustrative embodiments thereof, which is to be read in connection with the accompanying drawing.

DETAILED DESCRIPTION OF THE PREFERRED EMBODIMENTS

Figure 1:
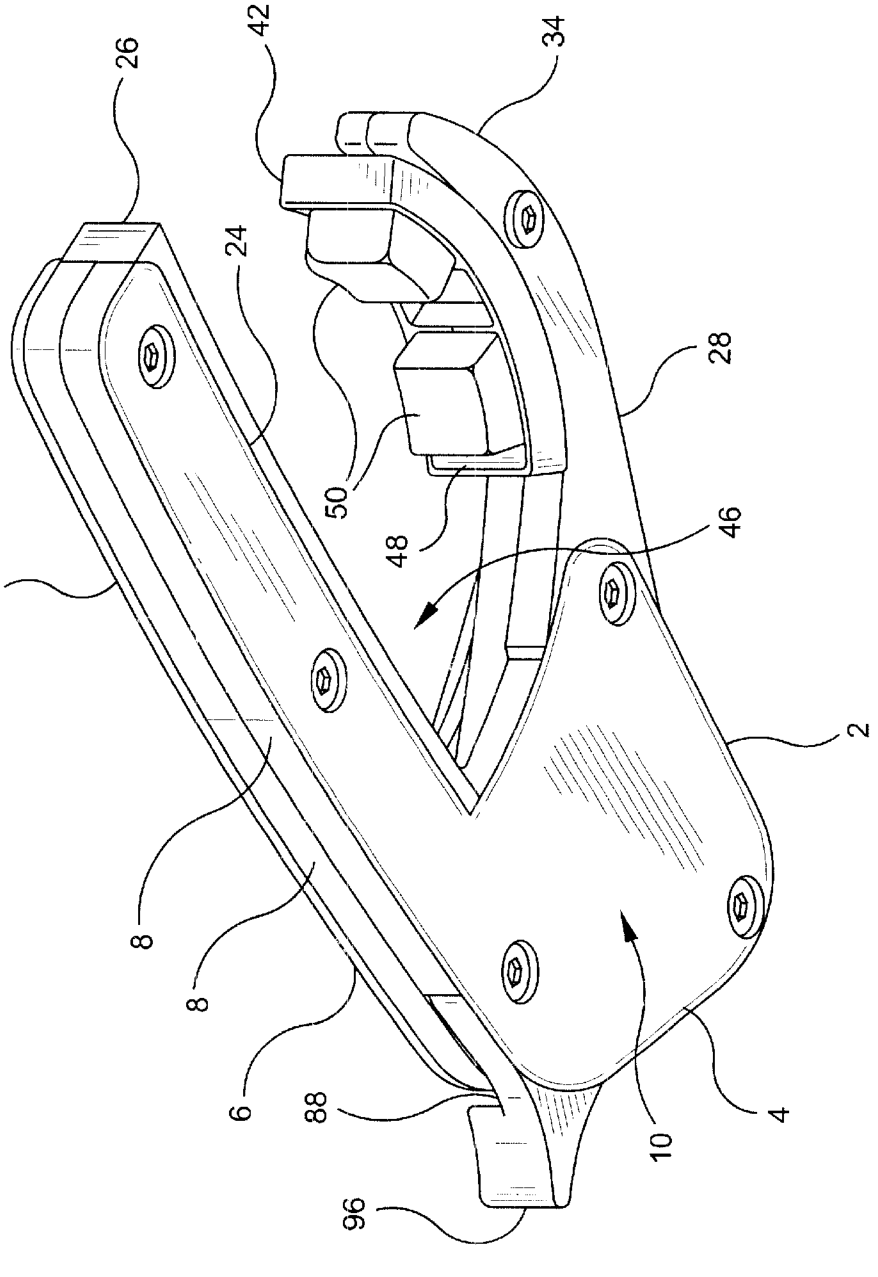
FIG. 1 is an isometric view of the assembled capo formed in accordance with one preferred form of the present invention.

Prior to referring to any one particular figure of the drawing, the capo of the present invention will be generally described. It includes a first arm and a second arm. At least one of the arms is moveable with respect to the other so that, effectively, the capo may be opened and closed about the neck of a musical instrument.

The capo includes at least one gear which is operatively coupled to at least one of the arms. Also, the capo includes a lock and release mechanism. The lock and release mechanism cooperatively interacts with the at least one gear. The lock and release mechanism selectively locks and unlocks at least one of the arms in its relative position to the other.

Referring initially to FIGS. 1–6 of the drawing, it will be seen that a capo for use with a stringed, musical instrument, constructed in accordance with one form of the present invention, first includes a generally L-shaped housing 2 formed of a top cover 4 and a mating back cover 6, and an inner frame 8 interposed between the two covers 4, 6. The L-shaped housing 2, formed from its covers and inner frame, has a main body portion 10 which defines an inner cavity 12 for at least partially housing the mechanism used for tensioning the strings of the musical instrument on which it is placed, and a fixed arm 14 extending from the main body portion 10. Preferably, the back cover 6 is formed with internally threaded standoffs 16*a–f* protruding inwardly of the housing. The inner frame 8 has formed through the thickness thereof corresponding openings 18 which are aligned with and dimensioned to receive certain standoffs 16*a–d*. The standoffs 16*a–d* thus hold the inner frame in place. Corresponding holes 20 are formed through the thickness of the top cover 4 in alignment with the threaded standoffs 16*a–e*, and screws 22 are received by the holes 20 and threaded into the standoffs 16*a–e* to hold the entire housing together. The inner frame 8 provides strength and rigidity to the capo so that it does not flex or break when in use.

The fixed arm 14 has an exposed surface 24 to which is affixed by adhesive or in any other manner, such as by over molding in a secondary molding operation, a top pad 26 made of a synthetic type rubber such as monoprene which can be made in varying durometers to achieve the best results, or other suitable material. It is the fixed arm 14 and, more particularly, the top pad 26 which engages the strings of the musical instrument. The fixed arm 14 may have a very slight curvature along its length so that it conforms as close as possible to the slight curvature of the fingerboard found on many typical, stringed, musical instruments. In one preferred form of the invention, the curvature of the fixed arm 14 is at a 12 inch radius to adapt to most fingerboards, but other embodiments may include a fixed arm having no curvature to a 15 inch radius curvature, or more. A classical guitar has a flat (i.e., 0 radius) fingerboard, whereas some electric guitars have a fingerboard with a 15 inch radius curvature transversely across the fingerboard.

The capo further includes a swing arm 28, which is preferably the moveable arm on the device. The swing arm 28 is pivotably mounted on the main body portion 10 of the L-shaped housing 2 and, as can be seen from the figures, is at least partially received by the cavity 12 defined by the housing. Preferably, the swing arm 28 is formed from two mating sections 30, 32, one being longer than the other. The swing arm 28 preferably exhibits a generally curved or concave shape along its length, and includes a free end portion 34 and a toothed end portion 36 opposite the free end portion 34. As can be seen from FIG. 2, one of the sections 32 which form the swing arm extends beyond the other section 30 to define a circular toothed gear segment 38 having a radius determined from the pivot point of the swing arm 28, as will be described in greater detail. At the free end portion 34, the mating surfaces of the two swing arm sections 30, 32 are notched so that, together, they form a slot 40 for mounting a swivel shoe 42, which preferably forms part of the swing arm and which will be described in greater detail.

The swing arm 28 has an opening 44 formed through the thickness thereof, that is, through its two mating sections 30, 32, which opening is dimensioned to receive one of the standoffs 16*e* of the housing back cover 6. Accordingly, the swing arm 28 is pivotably mounted to the main body portion 10 and pivots about the standoff 16*e*. The swing arm 28 is at least partially received by the cavity 12 defined by the housing. The swing arm 28, when mounted on the housing 2, extends in the same general direction as the fixed arm 14 and is situated co-planarly therewith to define with the fixed arm an open space 46 for receiving the neck of the musical instrument.

As mentioned previously, one of the disadvantages of conventional capos is that they usually contact the neck of the musical instrument at only one point, usually at the center of the neck. Thus, the force required to hold all the strings down is applied at this one point. However, the larger diameter strings need more force than the smaller diameter strings and, with the forces being applied at only one point, it is difficult to tension the large diameter strings properly without pulling the other strings out of tune.

The capo of the present invention overcomes this problem by including a self-adjusting tension swivel shoe 42. As can be seen from the figures, the swivel shoe 42 includes a concave surface 48 on which are preferably mounted two separated bottom support pads 50 which may be formed of the same material and be secured to the swivel shoe in the same manner as that of the top pad 26 described previously. The two bottom pads 50 engage the underside of the instrument neck at two points instead of one. The concave shape of not only the swing arm 28 but also the swivel shoe 42 allows the capo to conform as closely as possible to the typical curvature of the underside of the musical instrument neck.

On the side of the swivel shoe 42 opposite the bottom support pads 50 protrudes a neck 52 which is dimensioned to be received by the slot 40 formed in the free end portion of the swing arm 28. The neck 52 has an elongated slot 54 formed through the thickness thereof through which is received a pivot pin or, more preferably, an internally threaded bushing 56, which also passes through an opening 58 formed through the thickness of one section 32 of the swing arm. The bushing 56 is held in place by a cooperating screw 60 which passes through an aligned opening 62 formed through the opposite mating section 30 of the swing arm. The dimensions of the elongated slot 54 formed in the neck 52 of the swivel shoe, and the extent to which the neck 52 protrudes from the rear surface of the swivel shoe 42, are such as to allow the swivel shoe to be raised slightly above the inner surface 64 of the swing arm 28 and, further, to allow the swivel shoe 42 to slide and rock on the bushing 56 and move partially longitudinally along the free end portion 34 of the swing arm within the slot 40 receiving the neck 52. The rocking and sliding movement provided to the swivel shoe 42 by this design allows the swing arm 28 and, in particular, the swivel shoe, to self-center itself on the neck of the musical instrument, and apply the string tensioning force to the neck in two locations through the bottom support pads 50.

The smaller section 30 which comprises the swing arm 28 also has a circular shaped end 66 positioned inwardly from the toothed end portion 36 of the larger section 32. The radius of the circular end 66 is measured from the pivot point of the swing arm. This circular end 66 turns between, and substantially closes, the opening between two extending edge walls 68, 70 of the inner frame 8. Preferably centrally located on the circular end 66 is a protruding shoulder 72. As can be seen from FIG. 5, this shoulder 72 will engage the end of one edge wall 68 when the capo is closed to its minimum size, and the end of the opposite edge wall 70 when the capo is opened to its maximum size. The shoulder 72 acts as a stop to ensure that the toothed end portion 36 of the swing arm 28 always remains engaged with a pinion gear, as will be described, by limiting the arc in which the swing arm may pivot about its pivot point. This prevents damage and other problems associated with gear misalignment.

The capo of the present invention also includes a gear assembly. As will be seen, the gear assembly helps the capo provide and maintain the proper tension on the strings of the musical instrument when it is placed on the instrument neck and the arms are squeezed together.

More specifically, the gear assembly preferably is a ratchet and pinion gear assembly which is mounted on the main body portion 10 of the L-shaped housing 2 and at least partially received by the cavity 12 defined by the housing. Even more specifically, the ratchet and pinion gear assembly includes a ratchet wheel 74 (the larger "gear" shown in FIG. 3), and a pinion gear 76 (the smaller gear shown in FIG. 3) that is fixedly mounted co-axially on the ratchet wheel 74. The ratchet wheel 74 and pinion gear 76 are rotatably mounted on a center standoff 16*f* on the back cover, which standoff 16*f* is received by central openings 78 formed through each of the wheel and gear. The pinion gear 76 (i.e., the smaller gear) is further received by an open-sided bore 80 formed through the thickness of the inner frame 8 whose diameter is greater than that of the pinion gear 76 to allow the pinion gear to freely rotate therein. The open side 82 of the bore 80 exposes a plurality of teeth on the pinion gear 76 so that the pinion gear teeth may mesh with like teeth formed on the toothed end portion 36 of the swing arm 28. It should be noted that the inner edge walls 84, 86 on opposite sides of the opening 82 of the bore 80 of the inner frame are curved and have a diameter which is equal to or greater than that of the diameter of the toothed end portion 36 of the swing arm so that the toothed end portion may be closely received within the inner frame 8 to engage the pinion gear teeth.

The capo of the present invention also preferably includes a pawl assembly. The pawl assembly is mounted on the L-shaped housing 2 and is at least partially received by the cavity 12 defined by the housing. The assembly preferably includes a pawl 88, and a spring 90 (shown in FIGS. 2 and 3 as a coil compression spring) which engages the pawl 88 and biases it in such a way that it contacts the ratchet wheel 74.

More specifically, the pawl 88 has an opening 92 formed laterally through it which receives an upper standoff 16*c* of the housing back cover 6. The dimensions of this opening 92 are such that it allows the pawl 88 to pivot on this standoff 16*c*. The pawl 88 extends generally in opposite directions from its pivot opening 92. It has a first end in one direction on which is defined a contact surface, or more preferably, an edge or a protruding gear tooth 94, which engages the teeth of the ratchet wheel 74. The opposite end of the pawl 88 in the other direction is formed as a finger trigger 96 which protrudes between two edge side walls 98, 100 of the inner frame 8 which define an opening therebetween so that the finger trigger preferably extends beyond the periphery of the L-shaped housing 2.

Figure 2:
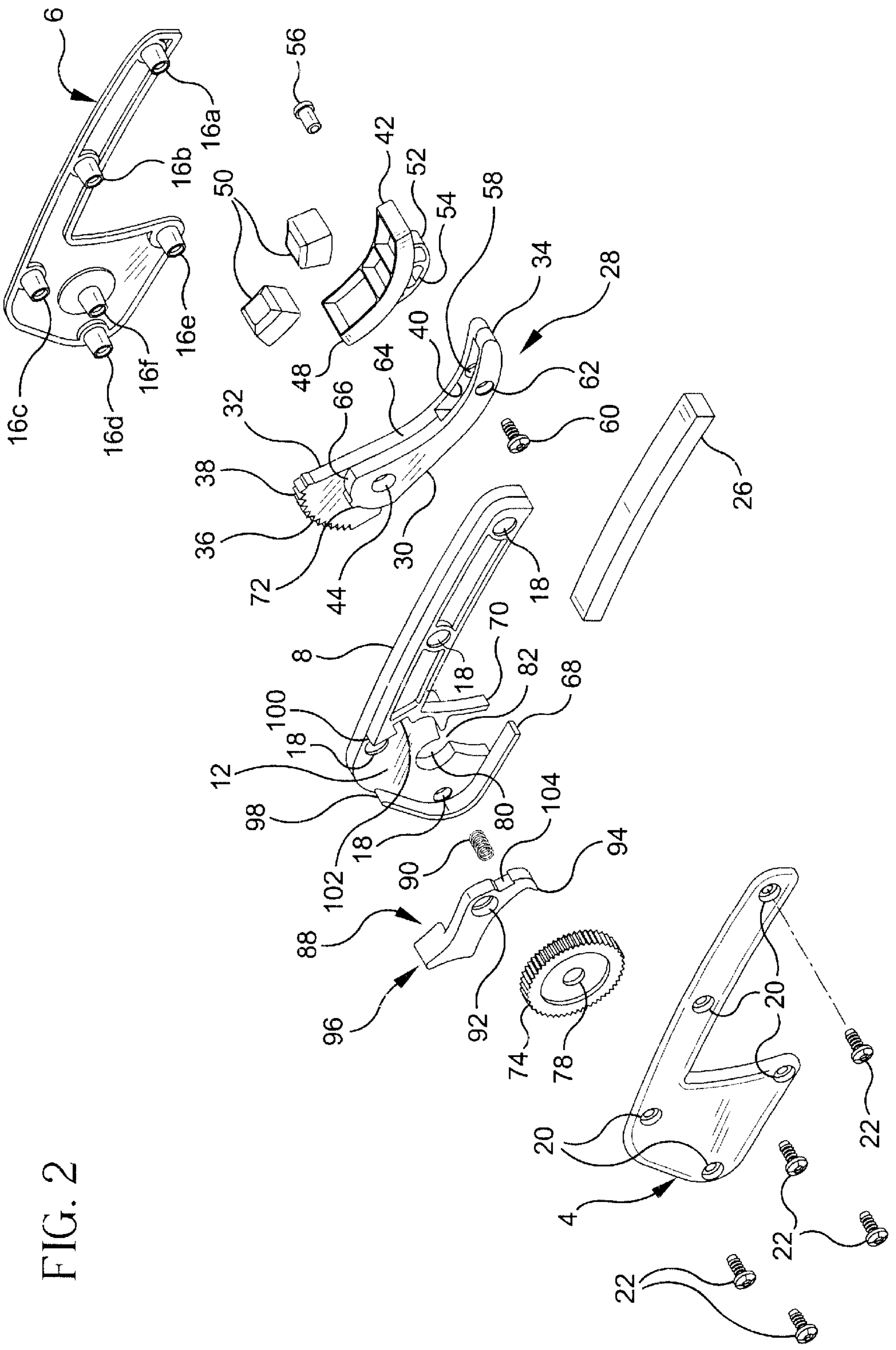
FIG. 2 is a front exploded view of the capo of the present invention shown in FIG. 1.
Figure 3:
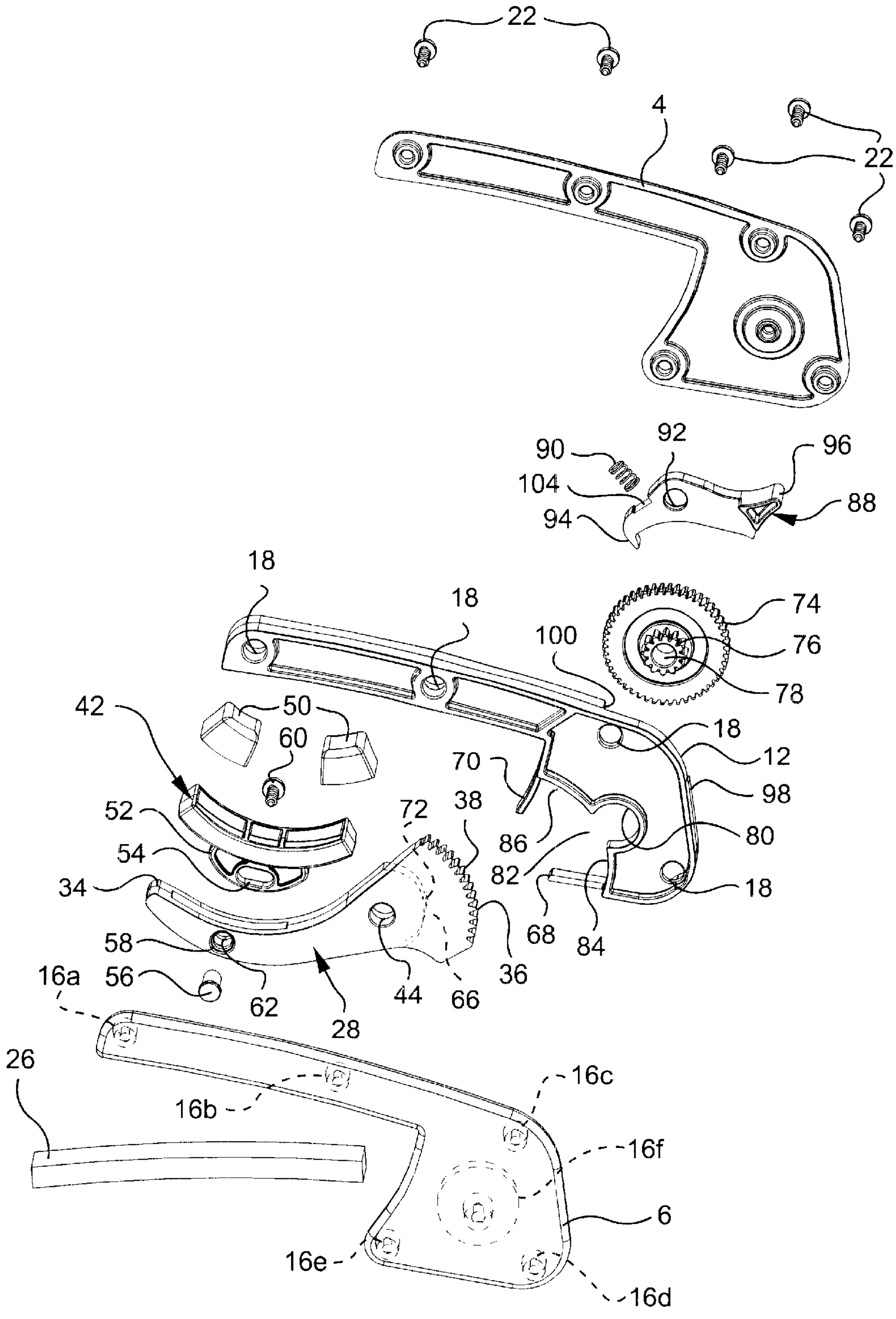
FIG. 3 is a rear exploded view of the capo of the present invention shown in FIG. 1.
Figure 5:
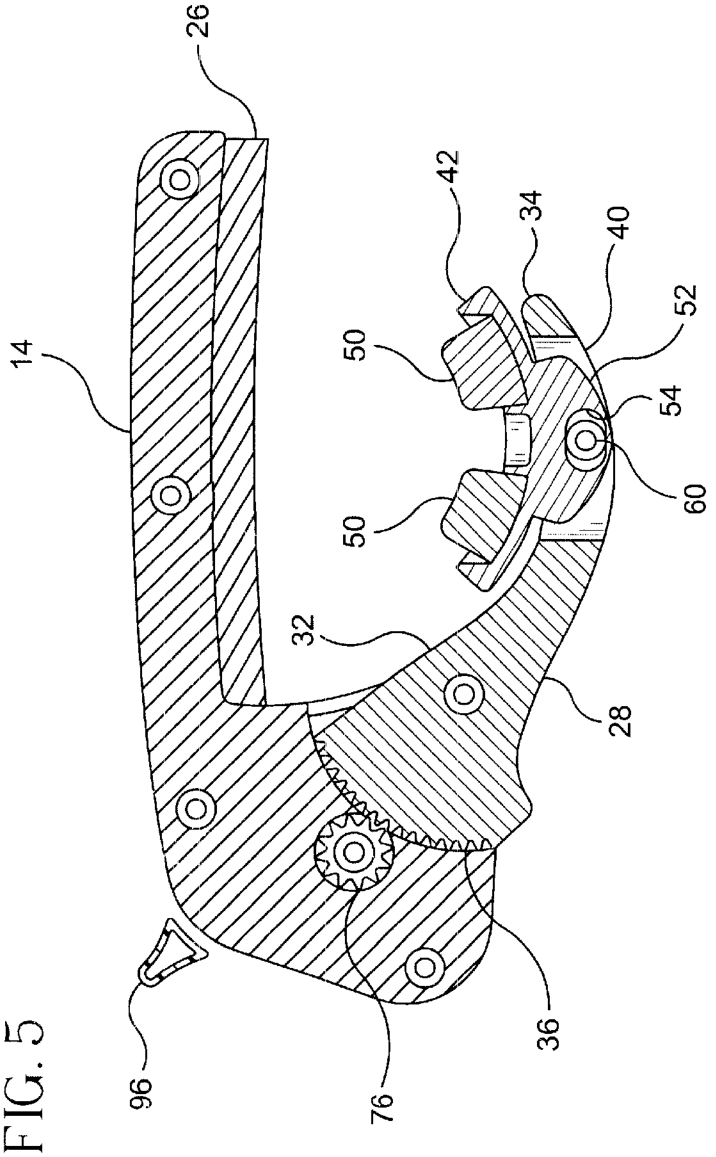
FIG. 5 is a cross-sectional view of the capo of the present invention shown in FIG. 4, taken along line A1—A1 of FIG. 4.
Figure 4:
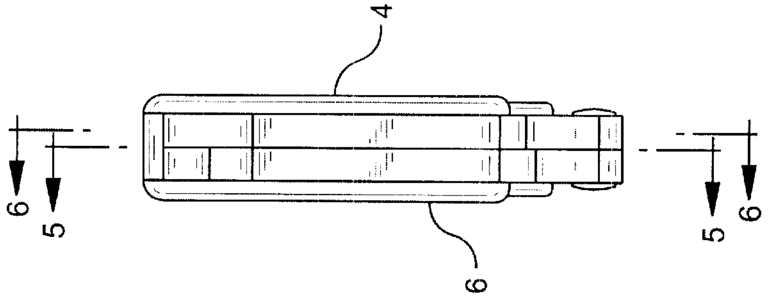
FIG. 4 is a rear edge view of the capo of the present invention shown in FIG. 1.
Figure 6:
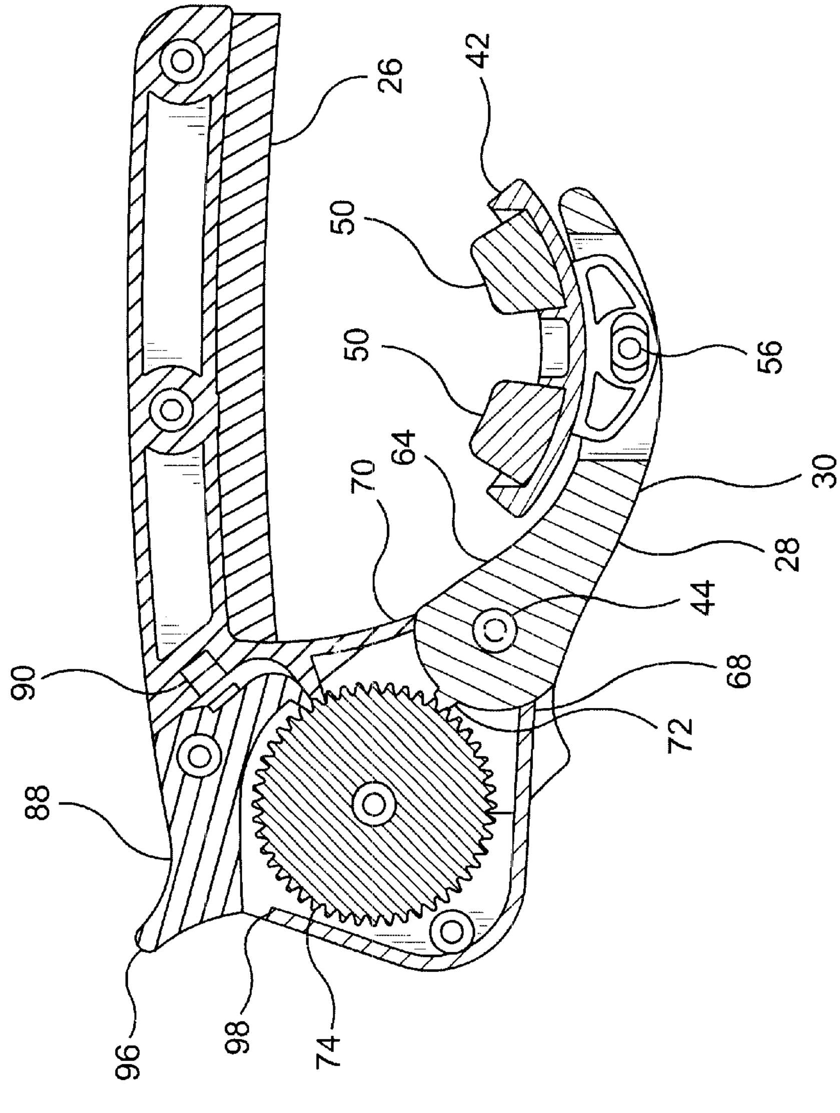
FIG. 6 is a cross-sectional view of the capo of the present invention shown in FIG. 4, taken along line A—A of FIG. 4.

A bias spring 90, preferably a coil compression spring as shown in FIGS. 2 and 3, has one end mounted in a recess 102 formed in an inner wall of the inner frame 8 and engages with its other end a corresponding recess 104 formed in a top edge on the first end of the pawl 88. When the pawl 88 is properly mounted on the upper standoff 16*c*, and the spring 90 is inserted between the two recesses 102, 104, the first end of the pawl 88 is forced by the spring 90 inwardly of the housing towards the ratchet wheel 74 so that its protruding gear tooth 94, contact surface or edge engages the teeth of the ratchet wheel. The user of the capo may exert finger pressure on the pawl trigger 96 to pivot the pawl 88 against the force of the spring 90 so that it disengages the teeth of the ratchet wheel 74. As will be explained in greater detail, this will allow the ratchet wheel 74 and, correspondingly, the pinion gear 76 affixed to it to rotate freely which, in turn, allows the capo to open (i.e., the swing arm 28 will move away from the fixed arm 14) so that it may be removed from or repositioned on the neck of the musical instrument.

As described above, the preferred form of the capo includes a larger ratchet wheel 74 and a smaller pinion gear 76 affixed to it. The purpose of having the wheel and the gear of unequal diameters is to provide precise tensioning to the strings of the musical instrument. The smaller pinion gear 76 is driven by the toothed end portion 36 of the swing arm 28. It, in turn, rotates the larger ratchet wheel 76 having a greater number of teeth. It is the pawl 88 which engages the larger ratchet wheel 74 and which normally prevents both the ratchet wheel 74 and pinion gear 76 from rotating in at least one direction, which would otherwise cause the capo to loosen on the instrument neck, but which preferably allows the ratchet wheel 74 and pinion gear 76 to rotate in the opposite direction when clamping the capo to the instrument neck.

The toothed end portion 36 of the swing arm 28 is preferably formed as a circular gear segment having a radius measured from the pivot point of the swing arm. The teeth of the gear segment intermesh with like teeth of the pinion gear 76. The radius of the gear segment is preferably greater than the radius of the pinion gear 76 so that rotational movement of the gear segment about the pivot point of the swing arm 28 causes correspondingly greater rotational movement of the pinion gear. This greater rotational movement of the pinion gear 76 causes an equally greater rotational movement to the ratchet wheel 74 co-axially affixed to it. Because of this gearing between the larger radius gear segment of the swing arm 28 and the smaller radius pinion gear 76, and because of the greater number of teeth on the ratchet wheel 74 compared to the pinion gear 76, per revolution, the capo can apply pressure to the strings with finer resolution as the arms are squeezed together.

A preferred ratio of the radius of the gear segment (i.e., toothed end portion 36) of the swing arm 28 to the radius of the pinion gear 76 is approximately 2:1, or higher, with a more preferred ratio being about 5:1. At a 5:1 ratio, the pinion gear 76 and, correspondingly, the ratchet wheel 74, preferably rotate about 280° with full movement of the swing arm 28. This relatively large rotation of the ratchet wheel 74, with its finer teeth, permits minute adjustments in tension applied to the strings.

Figure 7:
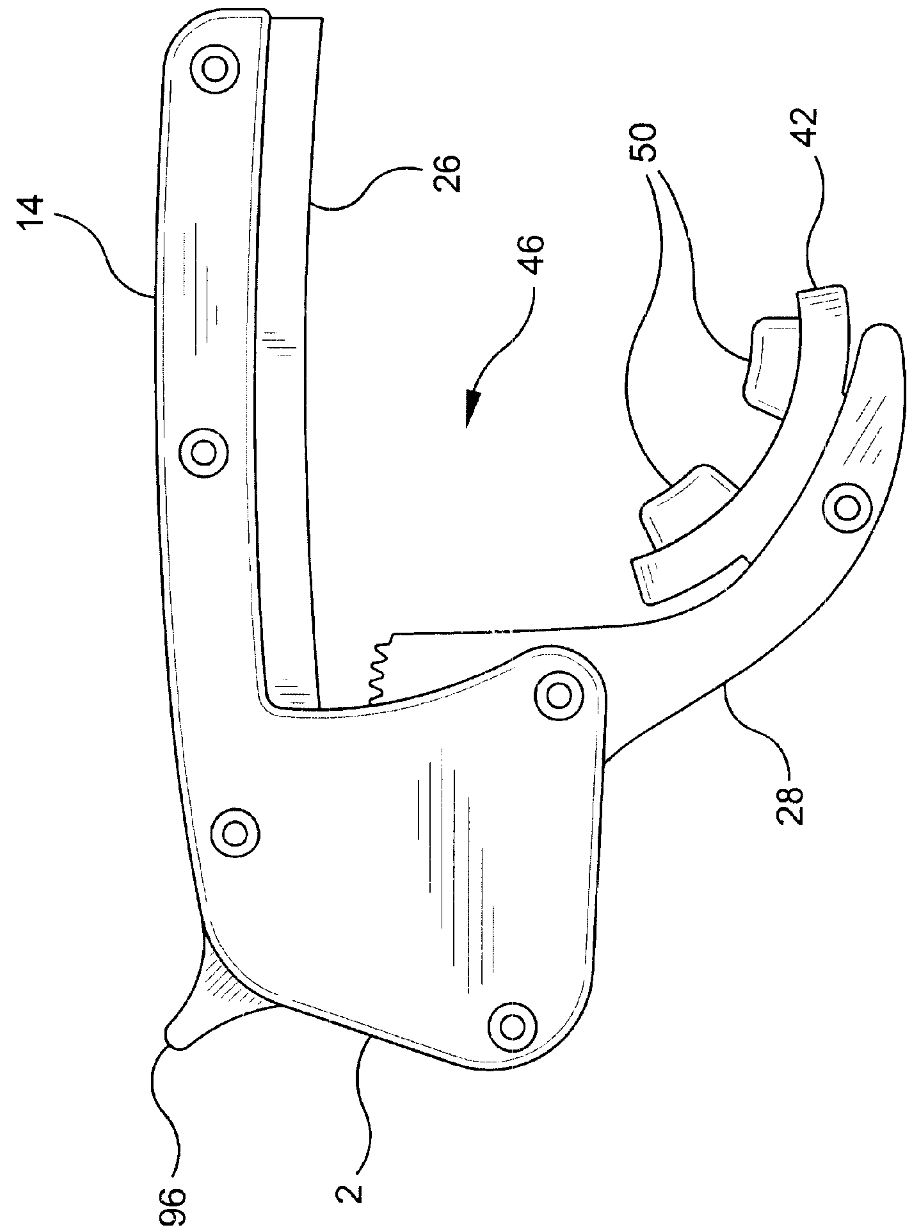
FIG. 7 is a side view of the capo of the present invention in which the arms are open to receive the neck of a musical instrument.
Figure 8:
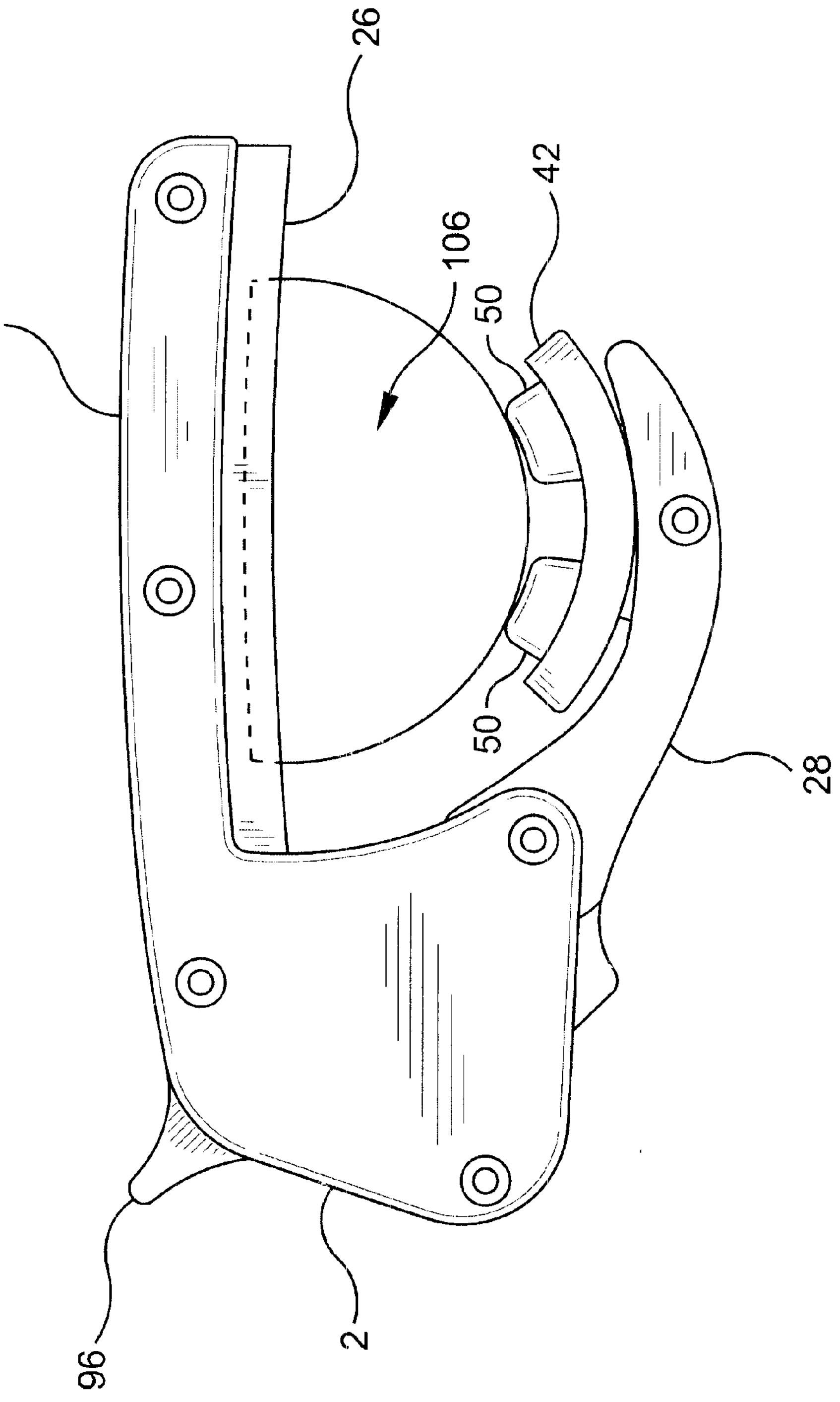
FIG. 8 is a side view of the capo of the present invention shown clamped onto the neck of a musical instrument, the instrument neck being shown in profile.

The capo of the present invention may be easily operated with one hand. In its open position, as shown in FIG. 7, the fixed arm 14 and the swing arm 28 define a wide opening 46 for receiving the neck 106 of the stringed, musical instrument. The user places the capo on the neck of the instrument, with the neck being in the space 46 between the two arms 14, 28, and squeezes the two arms together. By doing so, the swing arm 28 pivots with respect to the L-shaped housing 2 and fixed arm 14, and its toothed end portion 36 engages the teeth of the pinion gear 76, causing the pinion gear 76 and, consequently, the ratchet wheel 74 to rotate in one direction. It should be noted that the ratchet wheel teeth are preferably inclined in one rotational direction (shown as clockwise when viewing FIG. 5) to allow the tooth 94 of the biased pawl 88 to slip out of and over the ratchet wheel teeth as the capo is being closed (i.e., the swing arm 28 moves toward the fixed arm 14). The capo will actually make a noticeable clicking noise as the user squeezes it against the instrument neck. The clicking is the pawl 88 engaging the teeth of the ratchet wheel 74 as the ratchet wheel turns in one direction. The desired tension on the strings is maintained because the pawl 88 engages the ratchet wheel 74 and prevents it from turning in the opposite direction (counter-clockwise when viewing FIG. 5). As the capo is tightened on the instrument neck, the swivel shoe 42 self-adjusts longitudinally and pivotably on the swing arm 28 and provides tension forces in two locations on the neck through its two separated bottom support pads 50. It thus conforms more closely to the irregular shape of the instrument neck no matter where on the neck it is placed, without slipping.

To remove the capo, or reposition it on the neck of the instrument, the player pulls back on the trigger 96 of the pawl 88 with his finger against the force of the bias spring 90, which disengages the pawl tooth 94 from the ratchet wheel 74. This allows the ratchet wheel 74 and, consequently, the pinion gear 76 to rotate in the opposite direction (counter-clockwise when viewing FIG. 5). The pinion gear 76 may freely turn, which allows the toothed end portion 36 of the swing arm to rotate, and the swing arm 28 to pivot away from the fixed arm 14, opening the capo.

There are less preferred variations of the capo described previously which are envisioned to be within the scope of the present invention. For example, a capo could be designed with the biased pawl 88 directly engaging the toothed end portion 36 of the swing arm 28 and without employing the pinion gear 76 and ratchet wheel 74. This design, however, most likely would not provide the fine resolution provided by the preferred embodiment shown in FIGS. 1–8. It is also possible to use the pinion gear 76 itself serving as a form of ratchet wheel, without a separate ratchet wheel 74, where the pawl 88 engages the pinion gear to selectively prevent its rotation. Again, the fine adjustment in tension provided by the preferred embodiment may not be provided by such a design. It is also possible to have the ratchet wheel 74 in the form of a spur gear, not co-axially mounted to the pinion gear 76 but rather intermeshingly driven by it. Further, it is envisioned to have both arms moveable relative to each other and engaging separate intermeshing pinion gears, one of which may be linked to a ratchet wheel.

The capo of the present invention may be easily attached to and repositioned on the musical instrument by the player using one hand. It is relatively small and lightweight, and may be easily carried in the player's pocket. It is also relatively simple in construction. The capo can apply the proper tension to the strings of the instrument in fine gradations. With its swivel shoe, the capo self-adjusts to the shape of the instrument neck wherever it is placed along the fingerboard.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. A capo, which comprises:

a fixed arm;

a swing arm moveable relative to the fixed arm, the swing arm having a free end portion and a toothed end portion opposite the free end portion;

a gear assembly having at least one rotatable gear engaging the toothed end portion of the swing arm, wherein movement of the swing arm relative to the fixed arm causes the at least one gear to rotate;

a pawl cooperatively interacting with the gear assembly to selectively prevent the at least one gear from rotating in at least one direction; and a swivel shoe pivotably mounted on the free end portion of the swing arm.

2. A capo as defined by claim 1, wherein the swivel shoe includes a concave surface facing in the direction of the fixed arm.

3. A capo as defined by claim 2, wherein the concave surface of the swivel shoe has mounted thereon two spaced apart support pads for engaging a neck of a stringed, musical instrument.

4. A capo as defined by claim 1, wherein the fixed arm includes an exposed surface facing in the direction of the swing arm, and a pad affixed to the exposed surface for engaging strings of a stringed, musical instrument.

5. A capo as defined by claim 1, wherein the pawl selectively engages the at least one gear of the gear assembly.

6. A capo as defined by claim 1, wherein the pawl includes a contact surface; and wherein the pawl is resiliently biased to cause the contact surface to selectively contact the gear assembly.

7. A capo as defined by claim 6, wherein the contact surface of the pawl is in the form of a tooth.

8. A capo as defined by claim 1, wherein the pawl includes a contact surface; and wherein the pawl is resiliently biased to cause the contact surface to selectively engage the at least one gear of the gear assembly.

9. A capo, which comprises:

a fixed arm;

a swing arm moveable relative to the fixed arm, the swing arm having a free end portion and a toothed end portion opposite the free end portion;

a gear assembly having at least one rotatable gear engaging the toothed end portion of the swing arm, wherein movement of the swing arm relative to the fixed arm causes the at least one gear to rotate;

a pawl cooperatively interacting with the gear assembly to selectively prevent the at least one gear from rotating in at least one direction; and a swivel shoe mounted on the free end portion of the swing arm, the swivel shoe being pivotable thereon and adjustable longitudinally over a portion of the length of the free end portion.

10. A capo as defined by claim 9, wherein the swing arm includes a pivot member; and wherein the swivel shoe has formed therein an elongated slot, the pivot member being received by the elongated slot to allow the swivel shoe to reciprocatingly slide longitudinally on the pivot member and pivot thereon.

11. A capo, which comprises:

a fixed arm;

a swing arm moveable relative to the fixed arm, the swing arm having a free end portion and a toothed end portion opposite the free end portion;

a gear assembly having at least one rotatable gear engaging the toothed end portion of the swing arm, wherein movement of the swing arm relative to the fixed arm causes the at least one gear to rotate; and a pawl cooperatively interacting with the gear assembly to selectively prevent the at least one gear from rotating in at least one direction;

wherein the gear assembly includes a ratchet wheel and a pinion gear fixedly mounted co-axially on the ratchet wheel, each of the ratchet wheel and the pinion gear having teeth arranged about a circumference thereof, the number of teeth of the ratchet wheel being greater than the number of teeth of the pinion gear, the pawl selectively engaging the teeth of the ratchet wheel, the toothed end portion of the swing arm engaging the teeth of the pinion gear.

12. A capo as defined by claim 11, wherein the pinion gear has a radius associated therewith; the toothed end portion of the swing arm is formed as a gear segment having a radius associated therewith and engaging the pinion gear; and the ratio of the radius of the gear segment to the radius of the pinion gear is between about 2:1 and about 5:1.

13. A capo as defined by claim 11, wherein the pawl includes an exposed protrusion, the protrusion being contactable by a user of the capo to disengage the pawl from the teeth of the ratchet wheel.

14. A capo for use with a stringed, musical instrument having a neck, a fretted surface on one side of the neck, and strings extending longitudinally over the fretted surface, the capo comprising:

a generally L-shaped housing having a main body portion and a fixed arm extending outwardly from the main body portion, the main body portion of the housing defining a cavity therein;

a swing arm pivotably mounted on the main body portion and being partially received by the cavity thereof, the swing arm having a generally curved shape and extending from the main body portion generally in the direction of the fixed arm and being spaced apart from the fixed arm to define with the fixed arm an open space for receiving the neck of the musical instrument, the swing arm having a free end portion and a toothed end portion opposite the free end portion, the swing arm being adjustably moveable relative to the fixed arm to change the size of the open space between the arms, the swing arm including a generally concavely shaped swivel shoe pivotably and partially reciprocatingly slideably mounted on the free end of the swing arm, the swivel shoe including at least two support pads mounted thereon for contacting the neck of the musical instrument;

a ratchet and pinion gear assembly mounted on the main body portion of the L-shaped housing and at least partially received by the cavity thereof, the ratchet and pinion gear assembly having a ratchet wheel and a pinion gear fixedly mounted co-axially on the ratchet wheel, each of the pinion gear and the ratchet wheel being rotatable together with respect to the housing and having a plurality of teeth situated about a circumference thereof, the pinion gear being situated on the housing relative to the swing arm such that the teeth of the pinion gear engage the toothed end portion of the swing arm; and a pawl assembly, the pawl assembly being mounted on the L-shaped housing and being at least partially received by the cavity defined thereby, the pawl assembly including a pawl pivotably mounted on the L-shaped housing and a bias spring engaging the pawl and the housing, the pawl having a first end portion and a second end portion opposite the first end portion, the second end portion extending beyond the periphery of the L-shaped housing to allow a user to contact the second end portion with the user's finger, the spring biasing the pawl such that the first end portion of the pawl normally engages the teeth of the ratchet wheel to prevent rotation of the ratchet wheel and pinion gear in at least one direction, whereby finger pressure by the user on the second end portion of the pawl disengages the first end portion of the pawl from the ratchet wheel to allow rotation of the ratchet wheel and the pinion gear in the at least one direction.

15. A capo for use with a stringed, musical instrument having a neck and strings extending longitudinally along the neck, the capo comprising:

a housing having a fixed arm;

a swing arm pivotably mounted on the housing and being co-planar with and spaced apart from the fixed arm to define with the fixed arm an open space therebetween for receiving the neck of the musical instrument, the swing arm having a free end portion and a toothed end portion opposite the free end portion, the swing arm being adjustably moveable relative to the fixed arm to change the size of the open space between the arms;

a ratchet and pinion gear assembly mounted on the housing, the ratchet and pinion gear assembly having at least a ratchet wheel and a pinion gear fixedly mounted co-axially on the ratchet wheel, each of the pinion gear and the ratchet wheel being rotatable together with respect to the housing and having a plurality of teeth situated about a circumference thereof, the pinion gear being situated on the housing relative to the swing arm such that the teeth of the pinion gear engage the toothed end portion of the swing arm; and a pawl pivotably mounted on the housing and selectively engaging the teeth of the ratchet wheel, the pawl being positionable in at least a first position in which the pawl engages the ratchet wheel to prevent rotation of the ratchet wheel and pinion gear in at least one direction, the pawl being positionable in at least a second position in which the pawl is disengaged from the ratchet wheel to allow rotation of the ratchet wheel and the pinion gear in the at least one direction.

* * * * *